US012328330B1

(12) United States Patent
Zeng et al.

(10) Patent No.: US 12,328,330 B1
(45) Date of Patent: Jun. 10, 2025

(54) ALARM DATA PROCESSING METHOD, APPARATUS, MEDIUM AND ELECTRONIC DEVICE

(71) Applicant: Beijing Volcano Engine Technology Co., Ltd., Beijing (CN)

(72) Inventors: Wei Zeng, Beijing (CN); Jing Wen, Beijing (CN); Ting Cai, Beijing (CN); Songyuan Guan, Beijing (CN); Weichao Guo, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/961,324

(22) Filed: Nov. 26, 2024

(30) Foreign Application Priority Data

Feb. 21, 2024 (CN) .......................... 202410195543.7

(51) Int. Cl.
*H04L 9/40* (2022.01)
(52) U.S. Cl.
CPC ................................ *H04L 63/1425* (2013.01)
(58) Field of Classification Search
CPC .................................................. H04L 63/1425
USPC ............................................................ 726/22
See application file for complete search history.

(56) References Cited

U.S. PATENT DOCUMENTS

| 9,467,464 | B2 | 10/2016 | Gula et al. |
| 2010/0125663 | A1 | 5/2010 | Donovan et al. |
| 2014/0379301 | A1* | 12/2014 | Shastri ..................... G06F 17/18 702/183 |
| 2016/0119365 | A1* | 4/2016 | Barel ....................... G06F 16/95 726/12 |
| 2016/0173446 | A1* | 6/2016 | Nantel ................ H04L 63/1425 726/11 |
| 2021/0109915 | A1* | 4/2021 | Godden ................. G16H 10/60 |
| 2022/0329630 | A1* | 10/2022 | Li .......................... G06F 21/577 |

FOREIGN PATENT DOCUMENTS

| CN | 105553957 A | 5/2016 |
| CN | 109150572 A | 1/2019 |
| CN | 110730087 A | 1/2020 |
| CN | 112738016 A | 4/2021 |
| CN | 113691524 A | 11/2021 |
| CN | 116506276 A | 7/2023 |
| CN | 117395072 A | 1/2024 |

(Continued)

OTHER PUBLICATIONS

Office Action for Chinese Patent Application No. 202410195543.7, mailed on Aug. 29, 2024, 16 pages.

(Continued)

*Primary Examiner* — Badri Champakesan
(74) *Attorney, Agent, or Firm* — Astute IP Law Group

(57) ABSTRACT

The present disclosure relates to an alarm data processing method, an apparatus, a medium and an electronic device. The method includes: obtaining a plurality of pieces of alarm data to be processed; for each piece of alarm data of at least a portion of the plurality of pieces of alarm data, extracting threat indicators from the piece of alarm data; and for each threat indicator of at least a portion of the threat indicators that are extracted, performing data correlation analysis on the threat indicator to correlate pieces of historical data related to the threat indicator.

18 Claims, 7 Drawing Sheets

(56) References Cited

FOREIGN PATENT DOCUMENTS

| | | |
|---|---|---|
| CN | 117473571 A | 1/2024 |
| CN | 117527348 A | 2/2024 |
| CN | 117978516 B | 4/2025 |

OTHER PUBLICATIONS

Office Action received for Chinese Patent Application No. 202410195543.7, mailed on Nov. 18, 2024, 16 pages (8 pages of English Translation and 8 pages of Original Document).
Extended European Search Report for European Patent Application No. 24215101.7, mailed Apr. 7, 2025, 12 pages.
Snort Team., "Snort Users Manual 2.9.7", Retrieved from the Internet: URL: https://s3.amazonaws.com/snort-org-site/production/document_files/files/000/000/051/original/snort_manual.pdf?AWSAccessKeyId=AKIAIXACIED2SPMSC7GA Expires=1439298212 Signature=LOGf2R+mg2nKG8/6CK6orNBfrG4=, Oct. 13, 2014, 266 pages.

* cited by examiner

ALARM DATA PROCESSING METHOD, APPARATUS, MEDIUM AND ELECTRONIC DEVICE

CROSS-REFERENCE TO RELATED APPLICATION

The present application claims the priority to Chinese Patent Application No. 202410195543.7, filed on Feb. 21, 2024, the entire disclosure of which is incorporated herein by reference as portion of the present application.

TECHNICAL FIELD

The present disclosure relates to an alarm data processing method, an apparatus, a medium and an electronic device.

BACKGROUND

Network traffic products are in a key position of the first line of defense in the enterprise security protection architecture, and are facing a large number of security attacks all the time, which inevitably generates massive alarm logs. The traditional network traffic security alarm operation mode is that the security operation personnel analyze alarms one by one after alarm merging and deduplication, and perform traceability and evidence collection in combination with various data dimensions such as host, service, etc. to judge whether the alarms are real security risks. When a device has a huge number of alarms, if full operation is to be performed, there will be an obvious gap between manpower required by enterprise security operation and the number of alarms, and similar repetitive manual search for data tracing will cause low operation efficiency. In addition, the above operation mode cannot really solve the problem of full operation in related high-risk scenarios in a real and complex network and service environment, and is extremely prone to cause false negatives and false positives.

SUMMARY

This section of summary is provided to introduce concepts in a brief form that will be described in detail in the following section of detailed description. This Summary section is not intended to identify key features or essential features of the claimed technical solution, nor is it intended to limit the scope of the claimed technical solution.

In a first aspect, the present disclosure provides an alarm data processing method, including:
  obtaining a plurality of pieces of alarm data to be processed;
  for each piece of alarm data of at least a portion of the plurality of pieces of alarm data, extracting threat indicators from the piece of alarm data; and
  for each threat indicator of at least a portion of the threat indicators that are extracted, performing data correlation analysis on the threat indicator to correlate pieces of historical data related to the threat indicator.

In a second aspect, the present disclosure provides an alarm data processing apparatus, including:
  an obtaining module, configured to obtain a plurality of pieces of alarm data to be processed;
  an extraction module, configured to extract, for each piece of alarm data of at least a portion of the plurality of pieces of alarm data, threat indicators from the piece of alarm data; and
  a correlation analysis module, configured to perform, for each threat indicator of at least a portion of the threat indicators that are extracted, data correlation analysis on the threat indicator to correlate pieces of historical data related to the threat indicator.

In a third aspect, the present disclosure provides a computer-readable medium, storing a computer program thereon, where when the program is executed by a processing apparatus, the steps of the alarm data processing method provided by the first aspect of the present disclosure are implemented.

In a fourth aspect, the present disclosure provides an electronic device, including:
  a storage apparatus, storing a computer program thereon;
  a processing apparatus, configured to execute the computer program in the storage apparatus to implement the steps of the alarm data processing method provided by the first aspect of the present disclosure.

BRIEF DESCRIPTION OF DRAWINGS

The above and other features, advantages and aspects of embodiments of the present disclosure will become more apparent in combination with the drawings and with reference to the following detailed description. Throughout the drawings, the same or similar reference numerals represent the same or similar elements. It should be understood that the drawings are schematic and that the components and elements are not necessarily drawn to scale. In the drawings.

DETAILED DESCRIPTION

Figure 1:
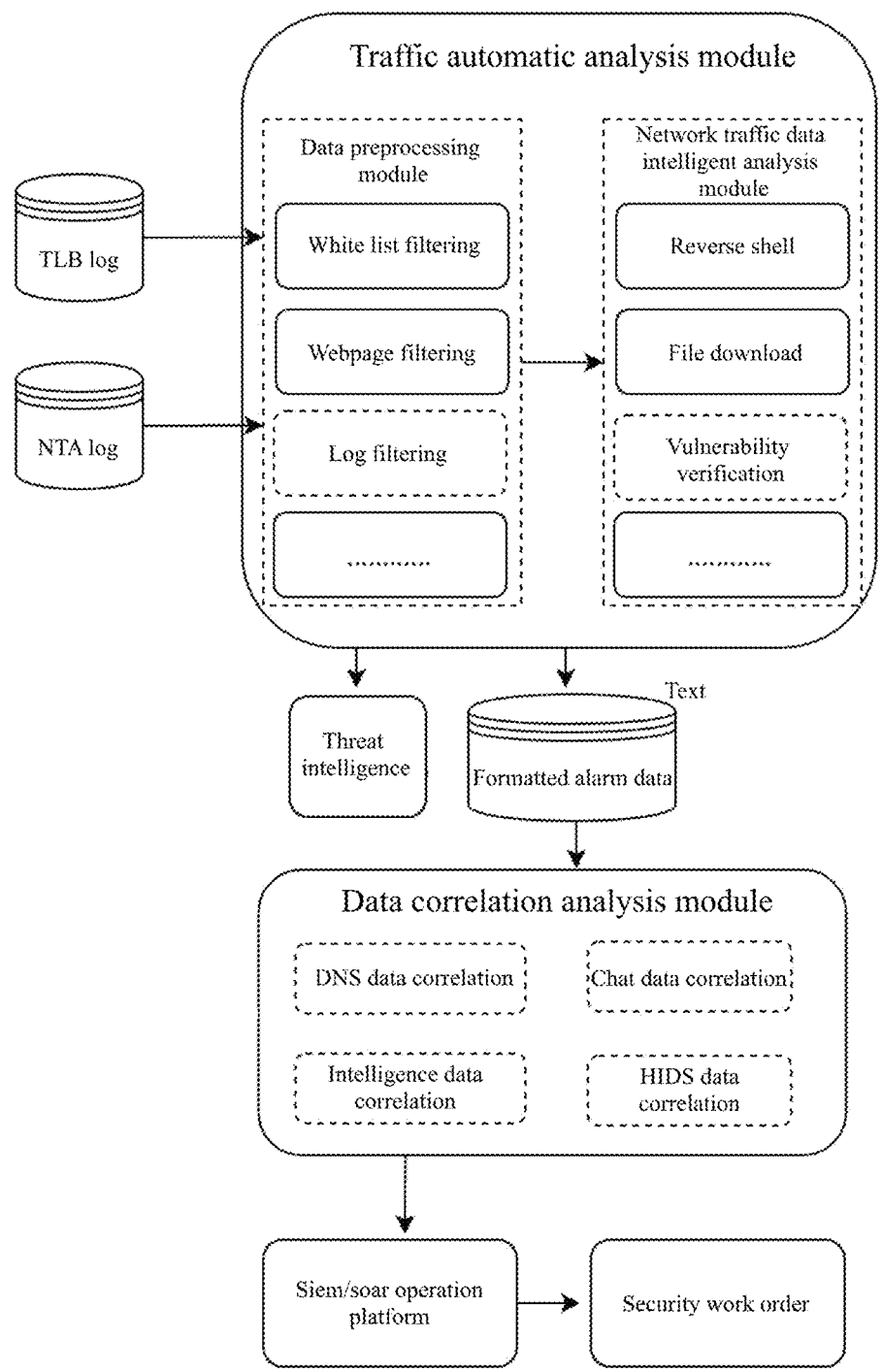
FIG. 1 is a schematic diagram of an alarm data processing system according to an exemplary embodiment.

Embodiments of the present disclosure will be described in more detail below with reference to the drawings. Although some embodiments of the present disclosure are shown in the drawings, it should be understood that the present disclosure may be implemented in various forms and should not be construed as limited to the embodiments set forth herein. Rather, these embodiments are provided for a thorough and complete understanding of the present disclosure. It should be understood that the drawings and the embodiments of the present disclosure are only for illustrative purposes, and are not intended to limit the protection scope of the present disclosure.

It should be understood that various steps described in the method implementations of the present disclosure may be performed in different orders, and/or performed in parallel. In addition, the method implementations may include additional steps and/or omit performing the illustrated steps. The scope of the present disclosure is not limited in this respect.

The term "include/include" and its variants as used herein are open-ended inclusions, that is, "include/include but not limited to". The term "based on" is "at least partially based on". The term "one embodiment" means "at least one embodiment"; the term "another embodiment" means "at least one other embodiment"; and the term "some embodiments" means "at least some embodiments". Relevant definitions of other terms will be given in the following description.

It should be noted that concepts such as "first," and "second," etc. mentioned in the present disclosure are only used to distinguish different apparatuses, modules or units, and are not used to limit the order or interdependence of functions performed by these apparatuses, modules or units.

It should be noted that modifications "one" and "more" mentioned in the present disclosure are illustrative rather than restrictive, and those skilled in the art should understand that unless the context clearly indicates otherwise, they should be understood as "one or more".

The names of messages or information exchanged between a plurality of apparatuses in the implementations of the present disclosure are only for illustrative purposes, and are not intended to limit the scope of these messages or information.

It can be understood that before using the technical solutions disclosed in the embodiments of the present disclosure, the user should be informed of the type, scope of use, use scenario, etc. of the personal information involved in the present disclosure in an appropriate manner in accordance with relevant laws and regulations, and the user's authorization should be obtained.

For example, in response to receiving an active request from a user, prompt information is sent to the user, so as to explicitly prompt the user that the operation requested to be performed will require acquisition and use of the user's personal information. Thereby, the user can independently choose whether to provide the personal information to the software or hardware such as the electronic device, the application, the server or the storage medium that performs the operations of the technical solutions of the present disclosure according to the prompt information.

As an optional but non-limiting implementation, in response to receiving the user's active request, the prompt information may be sent to the user in the form of a pop-up window, and the prompt information may be presented in text in the pop-up window. In addition, the pop-up window may also carry a selection control for the user to choose "agree" or "disagree" to provide the personal information to the electronic device.

It can be understood that the above process of notifying and acquiring the user's authorization is only illustrative, and does not constitute a limitation on the implementations of the present disclosure. Other methods that meet relevant laws and regulations may also be applied to the implementations of the present disclosure.

At the same time, it can be understood that the data involved in the technical solutions (including but not limited to the data itself, the acquisition or use of the data) should comply with requirements of corresponding laws and regulations and relevant provisions.

The present disclosure provides an alarm data processing system. As shown in FIG. 1, the system includes a traffic automatic analysis module and a data correlation analysis module, where the traffic automatic analysis module includes a data preprocessing module and a network traffic data intelligent analysis module. The data preprocessing module is configured to filter out, from alarm data to be processed, some common false alarm data or alarm data of a business scenario that is not concerned. The network traffic data intelligent analysis module is mainly configured to discriminate alarm data based on knowledge scenarios and natural language technologies, and automatically identify threat indicators (Indicators of Compromise, IOC) information in common high-risk scenarios and provide a unified interface service. The network traffic data intelligent analysis module is configured to perform structuring processing on the extracted threat indicator to obtain a structured threat indicator (that is, the formatted alarm data in FIG. 1) for the data correlation analysis module to use. The network traffic data intelligent analysis module is the most important and basic module for improving alarm judgment accuracy and operation efficiency. After the IOC is identified, the identified IOC may be matched with an IOC white list, and an IOC other than the IOC white list in the identified IOC is determined as threat intelligence. In the field of network security, an IOC is a key data point used to identify and detect malicious activities, and these indicators may be a file hash value, a malicious IP address, a registry entry, etc.

As shown in FIG. 1, the network traffic data intelligent analysis module mainly covers attack scenarios such as reverse shell, file download, vulnerability verification, domain name query, encoding scenario, host command execution, sandbox escape, etc.

The data correlation analysis module is configured to perform respectively Domain Name System (DNS) data correlation, chat data correlation, intelligence data correlation, and Host-based IDS (HIDS) data (hereinafter referred to as host data) correlation on each structured threat indicator, so as to correlate pieces of historical data related to the threat indicator, thereby obtaining a plurality of pieces of suspected risk information, and perform alarm judgment based on the plurality of pieces of suspected risk information, so as to identify real risk information, and then provide the real risk information to a Security Information and Event Management (SIEM)/Security Orchestration Automation and Response (SOAR) operation platform, to generate a security work order according to the real risk information.

Figure 2:
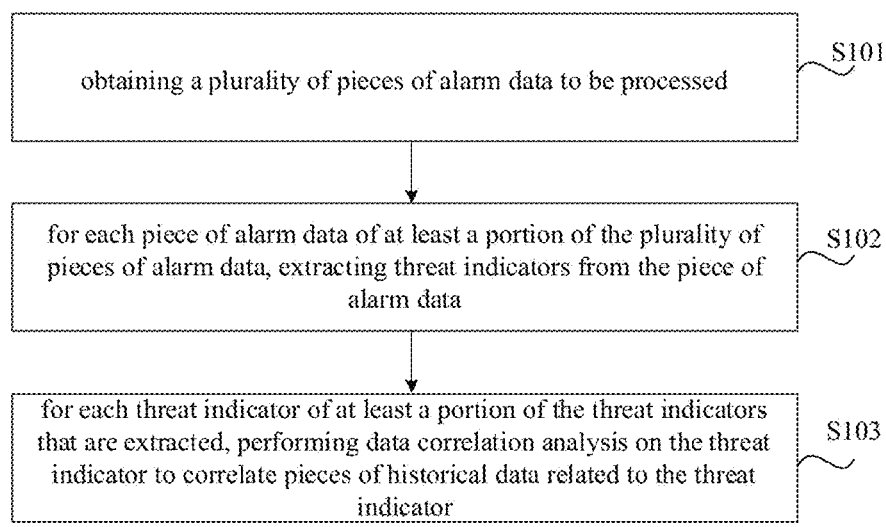
FIG. 2 is a flowchart of an alarm data processing method according to an exemplary embodiment.

FIG. 2 is a flowchart of an alarm data processing method according to an exemplary embodiment. As shown in FIG. 2, the alarm data processing method may include the following S101-S103.

In S101, a plurality of pieces of alarm data to be processed are obtained.

As shown in FIG. 1, the plurality of pieces of alarm data to be processed may be obtained from a transmit load balancing (TLB) alarm log message queue, a network traffic analysis (NTA) alarm log message queue. The alarm log of the TLB may be accessed to the alarm data processing system, and its related capabilities may be used to solve the problem of detection coverage of some encrypted traffic well, so that the encrypted log may also be incorporated into the security operation scope, thereby achieving the effect of expanding the traffic security operation scope.

In S102, for each piece of alarm data of at least a portion of the plurality of pieces of alarm data, threat indicators are extracted from the piece of alarm data.

In the present disclosure, the threat indicators in each piece of alarm data of the plurality of pieces of alarm data may be extracted, or the threat indicators in a portion of the plurality of pieces of alarm data may be extracted.

In S103, for each threat indicator of at least a portion of the threat indicators that are extracted, data correlation analysis is performed on the threat indicator to correlate pieces of historical data related to the threat indicator.

In the present disclosure, data correlation analysis may be performed on each threat indicator of the threat indicators that are extracted respectively, or data correlation analysis may be performed on a portion of the threat indicators that are extracted respectively.

With above technical solutions, the threat indicators may be automatically extracted from the piece of alarm data, and the data correlation analysis may be automatically performed on the threat indicators, so that the problem of low operation efficiency and low alarm accuracy caused by manual search of similar repetitive data tracing can be avoided, thereby greatly improving the security operation efficiency and the alarm accuracy, saving operation manpower, and allowing security operation personnel to focus on real risk events based on ensuring operation coverage and improve the discovery rate of real risks under the condition of operating the same number of alarms.

The following will give a detailed description of the specific implementation of extracting threat indicators from the piece of alarm data in above S102. Specifically, it may be implemented through step (11) and step (12).

Step (11): extracting threat indicators from the piece of alarm data by a machine learning-based classification model and a plurality of regular expression-based extraction models respectively.

Step (12): generating a threat indicator extraction result of the piece of alarm data according to a first extraction result of the classification model and a second extraction result of each of the extraction models.

In the present disclosure, the machine learning-based classification model may be a language model such as Bidirectional Encoder Representation from Transformers (BERT), or may be a deep learning model such as a convolutional neural network, a cyclic neural network, etc.

The plurality of regular expression-based extraction models may include an attack type-based regular expression expert model and at least one universal regular expression-based universal model. The number of universal models may be one or more. The regular expression uses a single string to describe and match a series of strings that meet a certain IOC rule. If the regular expression is successfully matched with the data to be matched, it means that the data to be matched contains an IOC.

The attack type-based regular expressions are regular expressions summarized by a security expert based on known attack types, that is, regular expressions summarized based on attack-related IOC rules. The expert model extracts attack threat indicators from the piece of alarm data based on these regular expressions. The attack type may include one or more of following: Structured Query Language (SQL) injection attack, Cross Site Script Attack (XSS), information disclosure attack, code injection attack, file upload attack, file inclusion attack, weak password attack, etc. Here, the attack type is only illustratively illustrated, without specific limitation.

Figure 3:
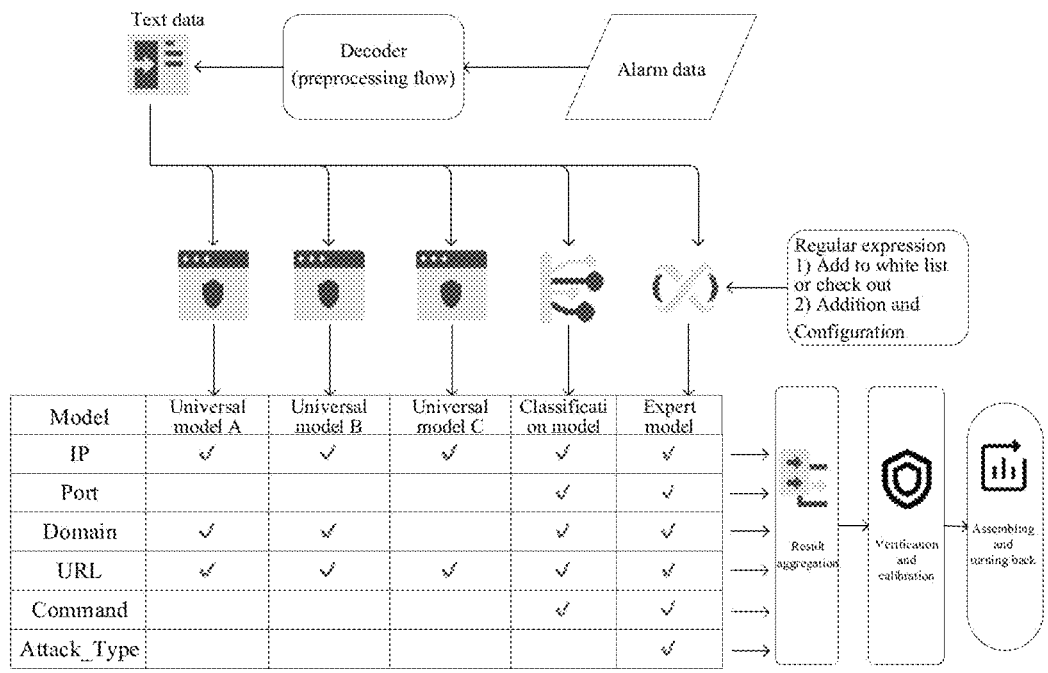
FIG. 3 is a schematic diagram of a threat indicator extraction method according to an exemplary embodiment.

As shown in FIG. 3, the expert model can use the summary of known attack scenarios to cover the detection of various threat indicator types such as network address (IP), port, domain name, link (URL), command (i.e. binary programs, such as python, curl, wget, git, etc.), attack type identification, etc., and provide the identification function of the attack type, so as to give the piece of alarm data additional attack scenario semantics, which is conducive to understanding the attack data and supporting other upstream services.

The universal regular expression is an expression defined based on a universal IOC rule, where the universal IOC rule is determined based on a data feature of a corresponding IOC, and the universal model is configured to extract a universal threat indicator.

The plurality of extraction models may include the attack type-based regular expression expert model and one universal regular expression-based universal model; alternatively, the plurality of extraction models may include the attack type-based regular expression expert model and a plurality of universal regular expression-based universal models. When there are a plurality of universal models, the regular expressions adopted between the plurality of universal models are different. Different universal models respectively focus on different threat indicator types, and can actively extract all IOCs of a corresponding threat indicator type from alarm data of an unknown threat, regardless of a fixed pattern or an attack scenario of the piece of alarm data.

The regular expressions used by different universal models to process the same threat indicator type may be different, representing extraction strategies of different strictness or different standards, so that the extraction results of different universal models may be different, that is, different universal models are enabled to provide the detection capabilities of different threat indicator types.

Exemplarily, as shown in FIG. 3, the plurality of extraction models include one expert model and three universal models, i.e. a universal model A, a universal model B, and a universal model C, where both the universal model A and the universal model B may be used for the detection of three threat indicator types of IP, Domain, and URL, and the universal model C is used for the detection of two threat indicator types of IP and URL.

In the above implementation, the expert model depends on experience and knowledge of the expert, and focuses on achieving the extraction of threat indicators in known or fixed-pattern attack scenarios, so as to achieve rapid detection efficiency and ensure basic detection effect. At the same time, in order to cope with the problem that a regular expression can only match a specific text pattern, an extractor of a universal threat indicator (i.e. the universal model) is additionally provided to improve the detection capability with a certain degree of flexibility, and when the experience of the expert has not been accumulated, basic detection results may also be provided for a specific threat indicator type (for example, IP, domain name, URL, etc.).

In addition, as shown in FIG. 3, the expert model also supports adding a new regular expression to the regular expression white list, or adding the configuration of the new regular expression to the regular expression pattern configuration set, so as to check suspicious data, thereby improving the expandability of the expert model to adapt to the dynamic changes and increasing complexity of network threats.

In order to facilitate the analysis and extraction of the IOC, as shown in FIG. 3, after the plurality of pieces of alarm data to be processed are obtained, data preprocessing may be performed on the plurality of pieces of alarm data respectively to obtain a plurality of pieces of text data, and then the classification model and each of the extraction models may extract an IOC from the plurality of pieces of text data.

The preprocessing flow for the pieces of alarm data may include the following three sections:

① data cleaning: mainly to remove invalid, redundant and irrelevant data in the pieces of alarm data, so as to improve the data quality. For example, redundant data packages in the pieces of alarm data are removed, missing values are filled, abnormal values are processed, etc.

② data conversion: mainly to convert the data obtained after data cleaning into a format suitable for analysis. Including converting binary and hexadecimal data into text data, or converting unstructured data into structured data. In addition, it may also include data standardization, for example, converting all data to the same scale, converting numeric data to text type, etc., so as to facilitate subsequent analysis and comparison.

③ data decoding: mainly to decode encoded data into an original format through a decoder, so as to facilitate subsequent analysis. For example, decoding data encoded by base64 encoding, URL encoding, etc. into regular text data that can be processed by the classification model.

As shown in FIG. 3, after a threat indicator set (i.e. the first extraction result) is extracted by the classification model, and threat indicator results (i.e. the second extraction result) are extracted by respective extraction modules, these threat indicator sets are aggregated to remove repeated threat indicators; and then, according to the threat indicator type, each IOC in the extraction result obtained after aggregation processing is verified for entity legality and filtered, to filter out the IOC with an irregular format, and then, the threat indicator extraction result of the piece of alarm data is obtained through assembling and turning back.

The following will give a detailed description of the specific implementation of performing data correlation analysis on the threat indicator to correlate the pieces of historical data related to the threat indicator in above S103. Specifically, it may be implemented through following steps (21)-(23).

Step (21): performing structuring processing on the threat indicator to obtain a structured threat indicator.

In the present disclosure, in order to facilitate data correlation analysis, structuring processing may be performed on the threat indicator to standardize the threat indicator, thereby obtaining the structured threat indicator. The structured threat indicator may include at least one of following field information: an IP field, a Port field, a Domain field, and a Command field.

Step (22): obtaining, according to the field information of the structured threat indicator, the pieces of historical data related to the threat indicator.

In the present disclosure, the pieces of historical data related to the threat indicator may include chat data, DNS data, intelligence data, host data, and the like.

Step (23): for each piece of historical data of at least a portion of the pieces of historical data related to the threat indicator, correlating the piece of historical data related to the threat indicator with the structured threat indicator to constitute a piece of suspected risk information.

In the present disclosure, each piece of historical data of the pieces of historical data related to the threat indicator may be correlated with the structured threat indicator respectively, or a portion of the pieces of historical data related to the threat indicator may be correlated with the structured threat indicator respectively.

There are usually a plurality of pieces of historical data related to the threat indicator, where the structured threat indicator obtained after structuring processing of the threat indicator and any piece of historical data correlated with the threat indicator constitute a piece of suspected risk information.

Exemplarily, the pieces of historical data related to the threat indicator include five pieces of chat data. If each piece of historical data related to the threat indicator correlated with the structured threat indicator respectively, the structured threat indicator obtained after structuring processing of the threat indicator is correlated with each piece of chat data of the five pieces of chat data respectively, so that five pieces of suspected risk information may be obtained.

The following will give a detailed description of the specific implementation of obtaining the pieces of historical data related to the threat indicator according to the field information of the structured threat indicator in above step (22).

Figure 4:
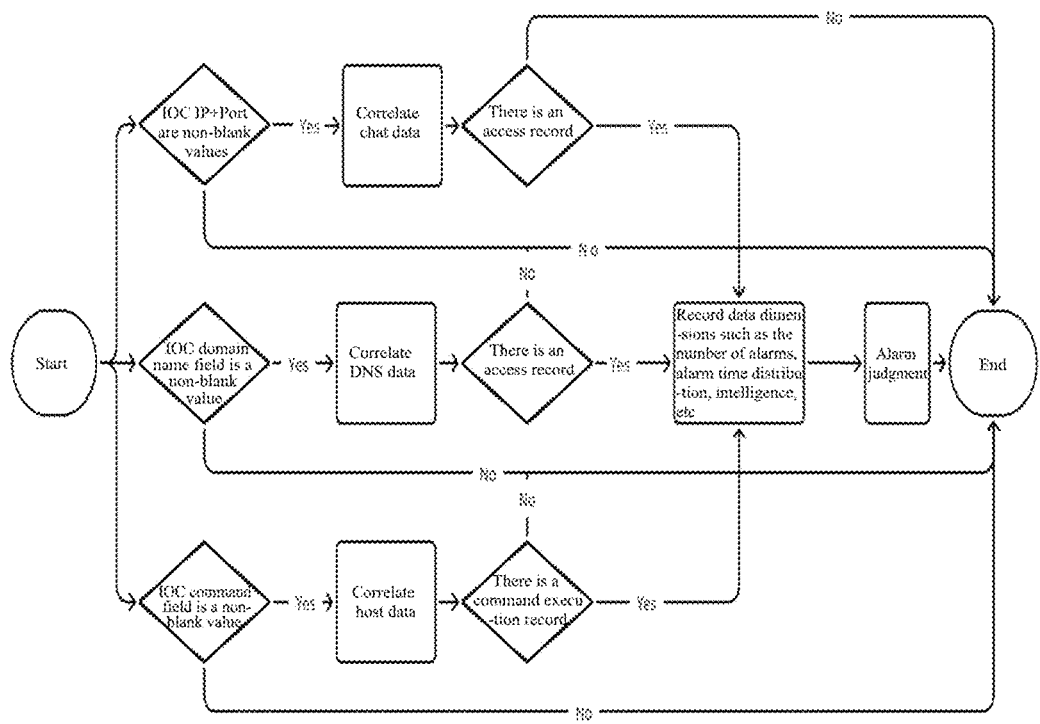
FIG. 4 is a schematic diagram of a process of data correlation analysis according to an exemplary embodiment.

Specifically, the structured threat indicator may include the IP field, the Port field, the Domain field, and the Command field. As shown in FIG. 4, in response to both the IP field and the Port field of the structured threat indicator being non-blank values, the pieces of chat data related to the threat indicator are obtained according to a field value of the network address field and a field value of the port field of the structured threat indicator, and then the pieces of chat data are correlated; in response to the domain name field of the structured threat indicator being a non-blank value, pieces of DNS data matching a field value of the domain name field are obtained from pieces of historical DNS data, and then the pieces of DNS data are correlated; in response to the command (specifically, a Remote Command Execute (RCE) command) field of the structured threat indicator being a non-blank value, the pieces of host data related to the threat indicator are obtained according to a field value of the command field, specifically, the pieces of host data matching the field value of the above command field may be obtained from pieces of historical host data, as the host data related to the threat indicator.

After the pieces of chat data and the pieces of DNS data are correlated, it may be determined whether there is a corresponding access record. At the same time, after the pieces of host data are correlated, it is determined whether there is a command execution record on the host. If there is a corresponding access record or a command execution record, the number of alarm data (i.e. the suspected risk information) and the alarm time distribution (i.e. time distribution information of the suspected risk information) are recorded, and pieces of threat intelligence data are recorded, that is, the pieces of threat intelligence data related to the threat indicator are obtained according to the field value of the network address field and the field value of the domain name field of the structured threat indicator. If there is no corresponding access record or no command execution record, no corresponding recording operation is performed.

In response to there being a blank value in the IP field and the Port field of the structured threat indicator, no chat data correlation is performed; in response to the domain name field of the structured threat indicator being a blank value, no DNS data correlation is performed, and in response to the command field of the structured threat indicator being a blank value, no host data correlation is performed.

The pieces of historical data related to the threat indicator may include the pieces of chat data related to the threat indicator, the pieces of DNS data matching the field value of the domain name field, the pieces of host data related to the threat indicator, and the pieces of threat intelligence data related to the threat indicator. The pieces of historical DNS data may be the pieces of DNS data within a first preset period (for example, seven days) before the alarm time corresponding to the corresponding alarm data. The pieces of historical host data may be the pieces of host data within the first preset period before the alarm time corresponding to the corresponding alarm data.

The following will give a detailed description of the specific implementation of obtaining the pieces of chat data related to the threat indicator according to the field value of the network address field and the field value of the port field of the structured threat indicator.

In an implementation, the pieces of chat data that match both the field value of the network address field and the field value of the port field of the structured threat indicator may be obtained from the pieces of historical chat data, as the pieces of chat data related to the threat indicator. The pieces of historical chat data may be the pieces of chat data within the first preset period before the alarm time corresponding to the corresponding alarm data.

Figure 5:
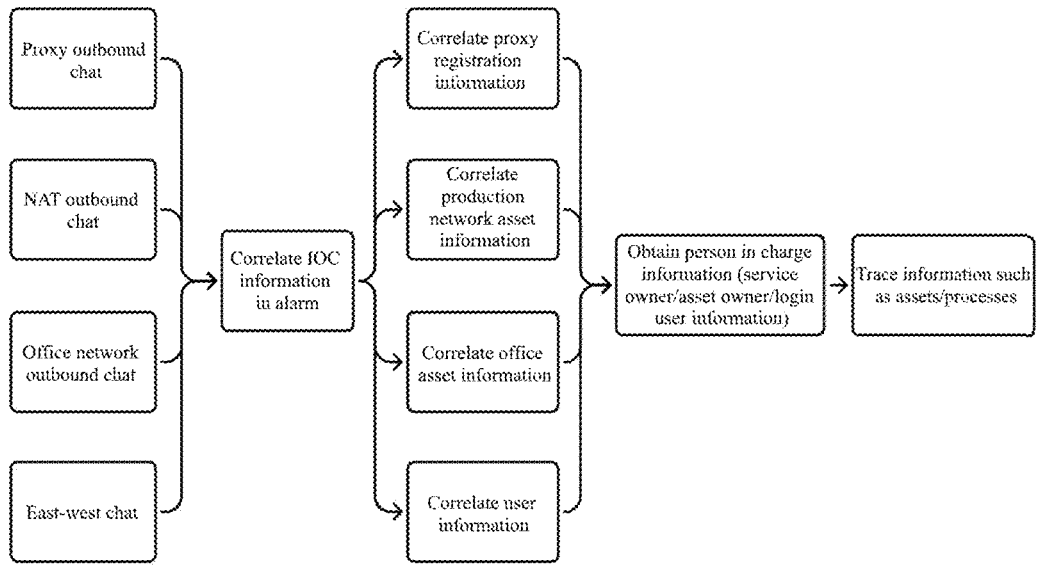
FIG. 5 is a schematic diagram of a process of chat data correlation according to an exemplary embodiment.

As shown in FIG. 5, the pieces of chat data have a plurality of types, for example, a proxy outbound chat, a Network Address Translation (NAT) outbound chat, an office network outbound chat (i.e. Internet outbound chat), and an east-west chat (i.e. east-west traffic chat), and the matching chat data may be obtained from different types of historical chat data respectively, and correlated with the structured IOC.

In another implementation, the pieces of chat data that match both the field value of the network address field and the field value of the port field of the structured threat indicator may be obtained from the pieces of historical chat data, as the pieces of chat data related to the threat indicator; at the same time, a target domain name corresponding to the field value of the network address field of the structured threat indicator is determined according to a corresponding relationship between a network address and a domain name; and then, the pieces of chat data matching the target domain name are obtained from the pieces of historical chat data, which are also used as the pieces of chat data related to the threat indicator. If an IP has been resolved by a domain name, a corresponding relationship between the IP and the domain name is established.

In the above implementation, the pieces of chat data can not only be correlated according to the field value of the IP field and the field value of the Port field in the structured threat indicator, but also be correlated according to the target domain name corresponding to the field value of the IP field in the structured threat indicator. In this way, the domain name information is reversely checked through the IP, and the pieces of chat data matching the reversely checked domain name information are obtained, so that the comprehensiveness of the correlated chat data can be improved, so as to find potential security risks, thereby improving the alarm accuracy.

Figure 6:
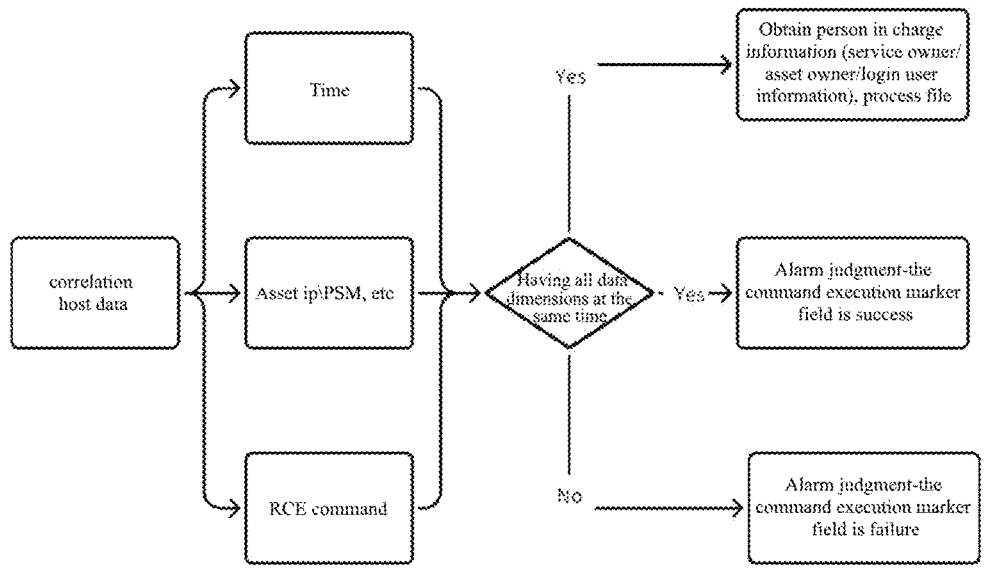
FIG. 6 is a schematic diagram of a process of host data correlation according to an exemplary embodiment.

As shown in FIG. 6, after the pieces of host data are correlated, it may be determined, from three dimensions of the RCE command, an initiation time of the command, and an IP or a PSM of an asset (i.e. an operator of the service or a user of the machine) that executes the command, whether the command (i.e. the current command) represented by the field value of the command field of the structured threat indicator is successfully executed (i.e. there is a command execution record). If one piece of correlated host data has data in all of the three dimensions at the same time, it is determined that the current command is successfully executed; otherwise, it is determined that the current command is executed unsuccessfully. The PSM is a unique identifier of a company service. Before developing a service, a name of the service needs to be determined first, and the service name is uniformly named with the PSM, where the PSM is Product Subsystem Module, and the naming needs to follow corresponding naming specifications.

The structured threat indicator may further include a command execution marker field, where when the current command is successfully executed, the field value of the command execution marker field of the corresponding structured threat indicator is success, and when the current command is executed unsuccessfully, the field value of the command execution marker field of the corresponding structured threat indicator is failure.

The following will give a detailed description of the specific implementation of obtaining the pieces of threat intelligence data related to the threat indicator according to the field value of the network address field and the field value of the port field.

Figure 7:
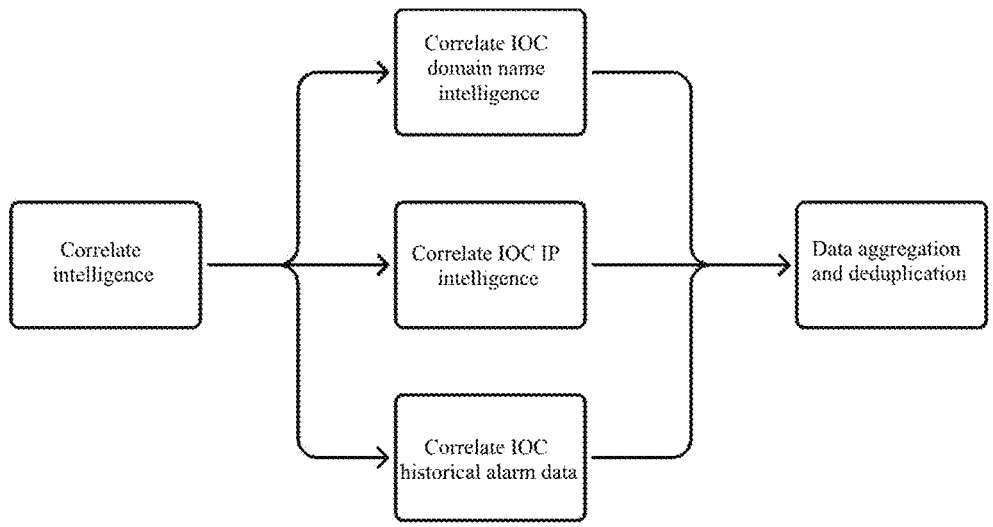
FIG. 7 is a schematic diagram of a process of intelligence data correlation according to an exemplary embodiment.

Specifically, as shown in FIG. 7, in response to the network address field of the structured threat indicator being a non-blank value, first threat intelligence data (i.e. IOC IP intelligence) matching the field value of the network address field is obtained from pieces of historical threat intelligence data; in response to the domain name field of the structured threat indicator being a non-blank value, second threat intelligence data (i.e. IOC domain name intelligence) matching the field value of the domain name field is obtained from pieces of historical threat intelligence data; and finally, aggregation processing is performed on the first threat intelligence data, the second threat intelligence data, and historical alarm data of the threat indicator to obtain the pieces of threat intelligence data related to the threat indicator.

The pieces of historical threat intelligence data may be the pieces of threat intelligence data within the first preset period before the alarm time corresponding to the corresponding alarm data. The pieces of historical alarm data of the threat indicator are the pieces of alarm data within a second preset period before the alarm time corresponding to the piece of alarm data where the threat indicator is located.

In order to further improve the comprehensiveness of the correlated chat data, so as to find potential security risks, and further improve the alarm accuracy, in addition to correlating the related DNS data, chat data may also be further correlated according to the correlated DNS data. Specifically, above step (22) may further include following steps:

obtaining, from pieces of historical chat data, pieces of chat data that match both a network address and a port in the matching domain name system data, as the pieces of chat data related to the threat indicator.

Figure 8:
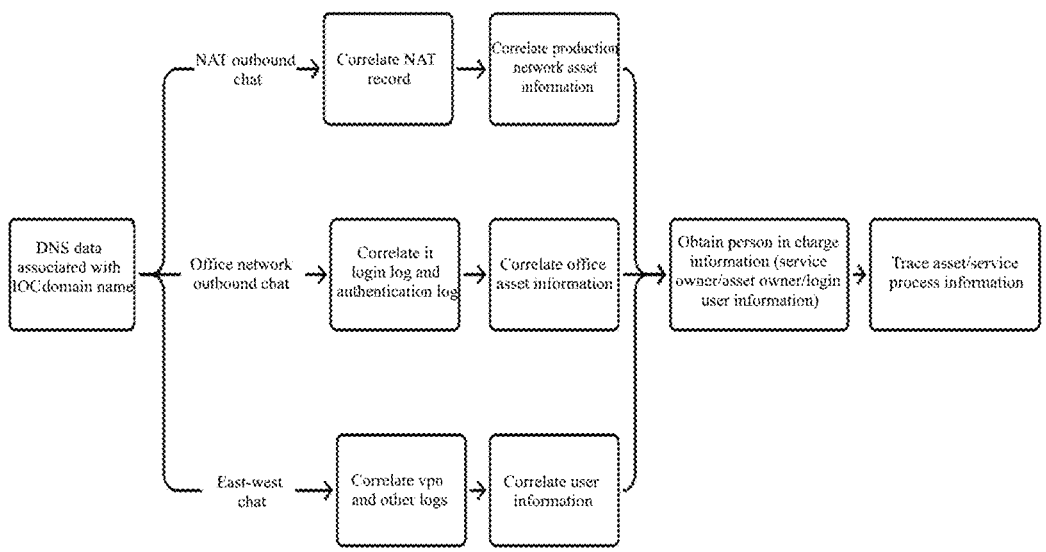
FIG. 8 is a schematic diagram of a process of DNS data correlation according to an exemplary embodiment.

As shown in FIG. 8, after the DNS data is correlated according to the field value of the domain name field in the structured threat indicator, the network address and the port in the matching DNS data may be obtained. If the network address and the port are obtained, the pieces of chat data that match both the network address and the port may be obtained from the pieces of historical chat data, as the pieces of chat data related to the threat indicator. Specifically, a NAT record matching both the network address and the port may be obtained from NAT outbound chat data, and the NAT record is correlated; at the same time, an information technology (internation technology, it) login log and an authentication log that match both the network address and the port are obtained from office network outbound chat data, and an it login log and an authentication log are correlated; at the same time, virtual private network (vpn) and other logs matching the target domain name are obtained from east-west chat data, and the vpn and other logs are correlated.

For the sake of performance of the alarm data processing system, some common false alarm data or alarm data of a business scenario that is not concerned may be filtered out from the piece of alarm data to be processed. Specifically, before above S102, above method may further include following steps:

filtering out pieces of false alarm data and/or pieces of alarm data of an irrelevant business scenario from the plurality of pieces of alarm data.

At this time, above S102 may be extracting, for each piece of alarm data of at least a portion of the pieces of alarm data obtained after filtering, the threat indicators from the piece of alarm data. In the present disclosure, the threat indicators in each piece of alarm data of the pieces of alarm data obtained after filtering may be extracted, or the threat indicators in a portion of the pieces of alarm data obtained after filtering may be extracted.

In an implementation, the pieces alarm data of an irrelevant business scenario may be filtered out from the plurality of pieces of alarm data.

As shown in FIG. 1, the plurality of pieces of alarm data may be filtered through a white list, specifically, the filtering may be performed based on any field in the pieces of alarm data (that is, filtering out pieces of alarm data containing the field from the plurality of pieces of alarm data), which is strongly related to the service, such as IP, domain name, PSM, etc., or may be specific content in the traffic load, and the filtering field may be flexibly set as required.

In another implementation, pieces of false alarm data may be filtered out from the plurality of pieces of alarm data.

As shown in FIG. 1, webpage filtering and log filtering may be performed on the plurality of pieces of alarm data. Specifically, in scenarios such as webpage browsing, searching, and webpage capturing by a user, due to unpredictability, a large number of pieces of false alarms are often generated in network traffic due to the content in the webpages, which causes interference to the operation. The HTML filtering technology for Chinese and English tutorials uses HTML entity parsing, character set analysis and pattern matching techniques in combination. By identifying and parsing HTML entities to accurately restore special characters and structures in the webpages, and then by analyzing the proportion of Chinese and English characters in the text, using language features to determine the language type of the main content of the page, and finally by detecting specific grammatical patterns and markers to achieve the recognition and classification of code blocks, tutorial webpages can be accurately recognized, and then such webpage alarm data can be filtered out.

In a real business environment, mechanisms such as log storage and data synchronization may generate false alarms due to the content in the logs being transmitted in the network. Based on operation feedback, precise filtering of business logs may be achieved through business log format, keywords, specific word statistics, and the like.

In yet another implementation, in order to maximize the performance of the alarm data processing system, the pieces of false alarm data and the pieces of alarm data of an irrelevant business scenario may be filtered out from the plurality of pieces of alarm data at the same time.

Figure 9:
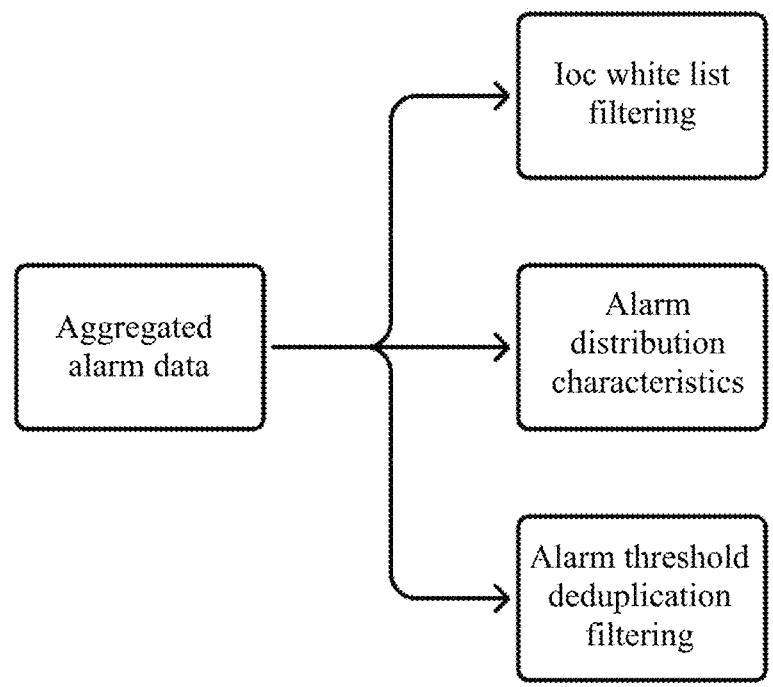
FIG. 9 is a schematic diagram of a process of alarm pre-judging according to an exemplary embodiment.

In order to further improve the security operation efficiency and the alarm accuracy, after obtaining a plurality of pieces of suspected risk information, as shown in FIG. 4, alarm judgment may be automatically performed to further save operation manpower. Specifically, as shown in FIG. 9, the above alarm data processing method may further include the following two steps:

filtering out pieces of suspected risk information of which alarm times reach a preset number of times per unit time from all pieces of suspected risk information (i.e. the aggregated alarm data in FIG. 9);

for each piece of suspected risk information of at least a portion of the pieces of suspected risk information obtained after filtering, determining whether the piece of suspected risk information is real risk information according to the piece of historical data related to the threat indicator in the piece of suspected risk information.

In the present disclosure, it may be determined whether each piece of suspected risk information of the pieces of suspected risk information obtained after filtering is real risk information, or it may be determined whether a portion of the pieces of suspected risk information obtained after filtering is real risk information.

Generally, a large number of threat attacks will not be performed in a short time. Therefore, the pieces of suspected risk information that alarm frequently per unit time (for example, per one hour) a likely to be false alarms, and thus alarm threshold deduplication filtering may be performed. That is, the pieces of suspected risk information of which alarm times reach a preset number of times per unit time is filtered out from all of the pieces of suspected risk information, so as to improve the security operation efficiency and the alarm accuracy.

In an implementation, whether the piece of suspected risk information is the real risk information may be determined by a pre-trained alarm pre-judging model according to the piece of historical data related to the threat indicator in the piece of suspected risk information.

After the alarm judgment, the real risk information in the pieces of suspected risk information obtained after filtering may be provided to the SIEM/SOAR operation platform, so that the security operation personnel can focus on real risk events based on ensuring operation coverage, and improve the discovery rate of real risks under the condition of operating the same number of alarms.

In addition, before above S103, above alarm data processing method may further include following steps:

filtering out threat indicators included in a threat indicator white list from the threat indicators that are extracted.

At this time, above S103 may be performing, for each threat indicator of at least a portion of the threat indicators obtained after filtering, data correlation analysis on the threat indicator. In the present disclosure, the data correlation analysis may be performed on each threat indicator of the threat indicators obtained after filtering respectively, or the data correlation analysis may be performed on a portion of the threat indicators obtained after filtering respectively.

In the above implementation, before the data correlation analysis is performed, the IOC is filtered out according to the IOC white list, which may reduce the workload of subsequent data correlation analysis, and further improve the security operation efficiency. As shown in FIG. 9, the IOC filtering operation may also be performed at the alarm judgment stage.

As shown in FIG. 5, FIG. 6 and FIG. 8, during chat data correlation, DNS data correlation and host data correlation, service information, person in charge information, process file information and the like of the asset will also be correlated at the same time, so as to enrich data dimension of the alarm, and facilitate tracing information such as the asset and the process during the subsequent disposal of security risk events. After matching and correlating to the corresponding type of chat data from the proxy outbound chat data, the proxy registration information in the chat data may be further correlated; after matching and correlating to the corresponding type of chat data from the NAT outbound chat data, the production network asset information in the chat data may be further correlated; after matching and correlating to the corresponding type of chat data from the office network outbound chat data, the office asset information in the chat data may be further correlated; and after matching and correlating to the corresponding type of chat data from the east-west outbound chat data, the user information in the chat data may be further correlated, so as to generate information such as service information, person in charge information and process file information of the asset according to the further correlated information. The service information and the person in charge information of the asset may include a service owner, an asset owner, login user information, and the like.

Figure 10:
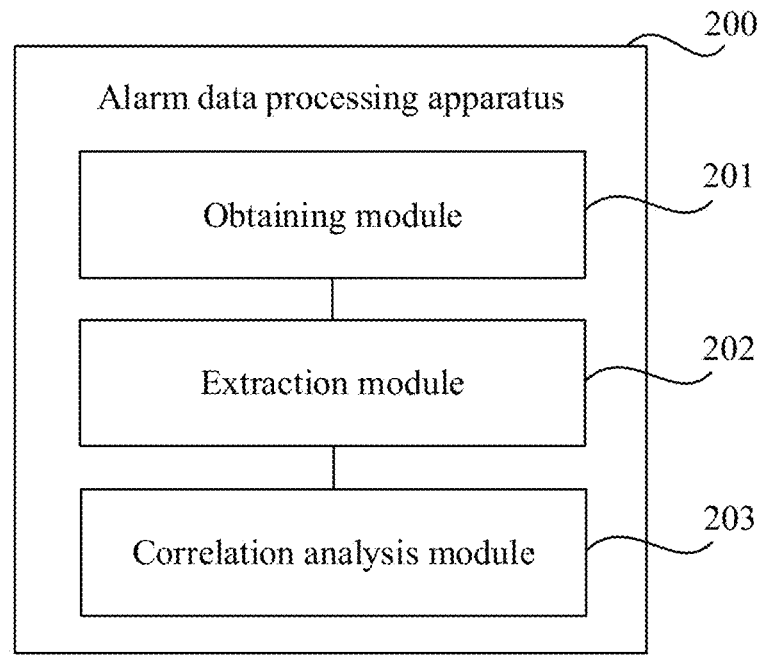
FIG. 10 is a block diagram of an alarm data processing apparatus according to an exemplary embodiment.

FIG. 10 is a block diagram of an alarm data processing apparatus according to an exemplary embodiment. As shown in FIG. 10, the alarm data processing apparatus 200 may include:

an obtaining module 201, configured to obtain a plurality of pieces of alarm data to be processed;

an extraction module 202, configured to extract, for each piece of alarm data of at least a portion of the plurality of pieces of alarm data, threat indicators from the piece of alarm data; and a correlation analysis module 203, configured to perform, for each threat indicator of at least a portion of the threat indicators that are extracted, data correlation analysis on the threat indicator to correlate pieces of historical data related to the threat indicator.

With above technical solutions, the threat indicators may be automatically extracted from the alarm data, and the data correlation analysis of the threat indicators may be automatically performed, so that the problem of low operation efficiency and low alarm accuracy caused by manual search of similar repetitive data tracing can be avoided, thereby greatly improving the security operation efficiency and the alarm accuracy, saving operation manpower, and allowing security operation personnel to focus on real risk events based on ensuring operation coverage and improve the discovery rate of real risks under the condition of operating the same number of alarms.

Optionally, the correlation analysis module 203 includes:

a structuring processing sub-module, configured to perform structuring processing on the threat indicator to obtain a structured threat indicator, where the structured threat indicator includes at least one of following field information: a network address field, a port field, a domain name field, and a command field;

a related historical data obtaining sub-module, configured to obtain, according to the field information of the structured threat indicator, the pieces of historical data related to the threat indicator; and a correlation sub-module, configured to, for each piece of historical data of at least a portion of the pieces of historical data related to the threat indicator, correlate the piece of historical data related to the threat indicator with the structured threat indicator to constitute a piece of suspected risk information.

Optionally, the structured threat indicator includes the network address field, the port field, the domain name field, and the command field;

the related historical data obtaining sub-module includes one or more of following:

a chat data obtaining sub-module, configured to: in response to both the network address field and the port field being non-blank values, obtain, according to a field value of the network address field and a field value of the port field, pieces of chat data related to the threat indicator;

a domain name system data obtaining sub-module, configured to: in response to the domain name field being a non-blank value, obtain, from pieces of historical domain name system data, pieces of domain name system data matching a field value of the domain name field;

a host data obtaining sub-module, configured to: in response to the command field being a non-blank value, obtain, according to a field value of the command field, pieces of host data related to the threat indicator;

an intelligence data obtaining sub-module, configured to: obtain, according to the field value of the network address field and the field value of the domain name field, pieces of threat intelligence data related to the threat indicator, where the pieces of historical data related to the threat indicator includes the matching chat data, the matching domain name system data, the related host data, and the related threat intelligence data.

Optionally, the chat data obtaining sub-module includes:

a first obtaining sub-module, configured to obtain, from pieces of historical chat data, pieces of chat data that match both the field value of the network address field and the field value of the port field, as the pieces of chat data related to the threat indicator.

Optionally, the first chat data obtaining sub-module further includes:

a determination sub-module, configured to determine, according to a corresponding relationship between a network address and a domain name, a target domain name corresponding to the field value of the network address field; and a second obtaining sub-module, configured to obtain, from the pieces of historical chat data, pieces of chat data matching the target domain name, as the pieces of chat data related to the threat indicator.

Optionally, the intelligence data obtaining sub-module includes:

a third obtaining sub-module, configured to: in response to the network address field being a non-blank value, obtain, from pieces of historical threat intelligence data, first threat intelligence data matching a field value of the network address field;

a fourth obtaining sub-module, configured to: in response to the domain name field being a non-blank value, obtain, from the pieces of historical threat intelligence data, second threat intelligence data matching the field value of the domain name field; and an aggregation processing sub-module, configured to perform aggregation processing on the first threat intelligence data, the second threat intelligence data, and historical alarm data of the threat indicator to obtain the pieces of threat intelligence data related to the threat indicator.

Optionally, the related historical data obtaining sub-module further includes:

a fifth obtaining sub-module, configured to obtain, from pieces of historical chat data, pieces of chat data that match both a network address and a port in the matching domain name system data, as the related chat data.

Optionally, the apparatus 200 further includes:

a first filtering module, configured to filter out pieces of suspected risk information of which alarm times reach a preset number of times per unit time from all pieces of suspected risk information; and a determination module, configured to, for each piece of suspected risk information of at least a portion of the pieces of suspected risk information obtained after filtering, determine whether the piece of suspected risk information is real risk information according to the piece of historical data related to the threat indicator in the piece of suspected risk information.

Optionally, the determination module is configured to determine whether the piece of suspected risk information is the real risk information by a pre-trained alarm pre-judging model according to the piece of historical data related to the threat indicator in the piece of suspected risk information.

Optionally, the apparatus 200 further includes:

a second filtering module, configured to filter out pieces of false alarm data and/or pieces of alarm data of an irrelevant business scenario from the plurality of pieces of alarm data, before the extraction module 202 extracts the threat indicators from the piece of alarm data for each piece of alarm data of the at least a portion of the plurality of pieces of alarm data;

the extraction module 202 is configured to extract the threat indicators from the piece of alarm data for each piece of alarm data of at least a portion of the pieces of alarm data obtained after filtering.

Optionally, the apparatus 200 further includes:

a third filtering module, configured to filter out threat indicators included in a threat indicator white list from the threat indicators that are extracted, before the correlation analysis module 203 performs, for each threat indicator of at least a portion of the threat indicators that are extracted, data correlation analysis on the threat indicator;

the correlation analysis module 203 is configured to perform, for each threat indicator of at least a portion of the threat indicators obtained after filtering, data correlation analysis on the threat indicator.

Optionally, the extraction module 202 includes:

an extraction sub-module, configured to extract the threat indicators from the piece of alarm data by a machine learning-based classification model and a plurality of regular expression-based extraction models respectively, where the plurality of regular expression-based extraction models include an attack type-based regular expression expert model and at least one universal regular expression-based universal model;

a generation sub-module, configured to generate a threat indicator extraction result of the piece of alarm data according to a first extraction result of the classification model and a second extraction result of each of the extraction models.

The present disclosure further provides a computer-readable medium, storing a computer program thereon. When the program is executed by a processing apparatus, the steps of the above alarm data processing method provided by the present disclosure are implemented.

Figure 11:
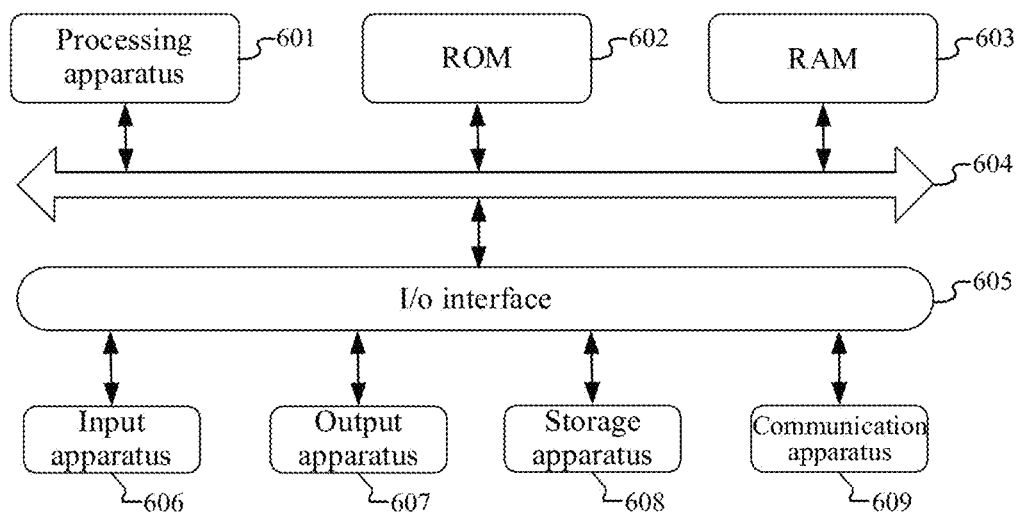
FIG. 11 is a schematic structural diagram of an electronic device according to an exemplary embodiment.

Reference will be made below to FIG. 11, which illustrates a schematic structural diagram of an electronic device (such as a terminal device or a server) 600 suitable for implementing the embodiments of the present disclosure. The terminal device in the embodiments of the present disclosure may include but not limited to a mobile terminal such as a mobile phone, a laptop, a digital broadcast receiver, a PDA (Personal Digital Assistant), a PAD (tablet computer), a PMP (Portable Multimedia Player), a vehicle-mounted terminal (such as a vehicle navigation terminal), etc., and a fixed terminal such as a digital TV, a desktop computer, etc. The electronic device shown in FIG. 11 is only an example and should not bring any limitation to the function and scope of use of the embodiments of the present disclosure.

As shown in FIG. 11, the electronic device 600 may include a processing apparatus (such as a central processing unit, a graphics processing unit, etc.) 601, which may execute various appropriate actions and processes according to a program stored in a read-only memory (ROM) 602 or a program loaded from a storage apparatus 608 into a random access memory (RAM) 603. In the RAM 603, various programs and data required for the operation of the electronic device 600 are also stored. The processing apparatus 601, the ROM 602, and the RAM 603 are connected to each other by a bus 604. An input/output (I/O) interface 605 is also connected to the bus 604.

Generally, the following apparatuses may be connected to the I/O interface 605: an input apparatus 606 including for example a touch screen, a touchpad, a keyboard, a mouse, a camera, a microphone, an accelerometer, a gyroscope, etc.; an output apparatus 607 including for example a liquid crystal display (LCD), a speaker, a vibrator, etc.; the storage apparatus 608 including for example a magnetic tape, a hard disk, etc.; and a communication apparatus 609. The communication apparatus 609 may allow the electronic device 600 to perform wireless or wired communication with other devices to exchange data. Although FIG. 11 shows the electronic device 600 having various apparatuses, it should be understood that it is not required to implement or have all of the illustrated apparatuses. More or fewer apparatuses may alternatively be implemented or provided.

In particular, according to the embodiments of the present disclosure, the process described above with reference to the flowchart may be implemented as a computer software program. For example, an embodiment of the present disclosure includes a computer program product, which includes a computer program carried on a non-transitory computer-readable medium, and the computer program includes program codes for executing the method shown in the flowchart. In such an embodiment, the computer program may be downloaded and installed from a network through the communication apparatus 609, or installed from the storage apparatus 608, or installed from the ROM 602. When the computer program is executed by the processing apparatus 601, the above functions defined in the method of the embodiment of the present disclosure are executed.

It should be noted that the above computer-readable medium in the present disclosure may be a computer-readable signal medium or a computer-readable storage medium, or any combination thereof. The computer-readable storage medium may be, for example, but not limited to, an electronic, magnetic, optical, electromagnetic, infrared, or semiconductor system, apparatus or device, or any combination thereof. More specific examples of the computer-readable storage medium may include, but are not limited to: an electrical connection with one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination thereof. In the present disclosure, the computer-readable storage medium may be any tangible medium that contains or stores a program, and the program may be used by or in combination with an instruction execution system, apparatus or device. In the present disclosure, the computer-readable signal medium may include a data signal propagated in a baseband or as part of a carrier wave, in which a computer-readable program code is carried. This propagated data signal may take many forms, including but not limited to an electromagnetic signal, an optical signal, or any suitable combination thereof. The computer-readable signal medium may also be any computer-readable medium other than the computer-readable storage medium. The-readable signal medium may send, propagate or transmit a program for use by or in combination with an instruction execution system, apparatus or device. The program code contained on the computer-readable medium may be transmitted by any suitable medium, including but not limited to: electric wire, optical cable, RF (radio frequency), etc., or any suitable combination thereof.

In some implementations, the client and the server can communicate using any currently known or future developed network protocol such as HTTP (HyperText Transfer Protocol), and can communicate (via a communication network) and interconnect with any form or medium of digital data. Examples of the communication network include a local area network ("LAN"), a wide area network ("WAN"), the Internet, and an end-to-end network (such as an ad hoc end-to-end network), as well as any networks currently known or to be developed in the future.

The above-mentioned computer-readable medium may be included in the above-mentioned electronic device; or it may exist alone without being assembled into the electronic device.

The above computer-readable medium carries one or more programs, and when the one or more programs are executed by the electronic device, the electronic device is caused to: obtain a plurality of pieces of alarm data to be processed; for each piece of alarm data of at least a portion of the plurality of pieces of alarm data, extract threat indicators from the piece of alarm data; and for each threat indicator of at least a portion of the threat indicators that are extracted, perform data correlation analysis on the threat indicator to correlate pieces of historical data related to the threat indicator.

The computer program codes for performing the operations of the present disclosure may be written in one or more programming languages or a combination thereof. The programming languages include but not limited to object-oriented programming languages such as Java, Smalltalk, C++, and also include conventional procedural programming languages such as "C" language or similar programming languages. The program codes may be executed entirely on the user's computer, partly on the user's computer, as a stand-alone software package, partly on the user's computer and partly on a remote computer, or entirely on the remote computer or server. In the case of involving the remote computer, the remote computer may be connected to the user's computer through any kind of network including a local area network (LAN) or a wide area network (WAN), or may be connected to an external computer (for example, connected via the Internet using an Internet service provider).

The flowcharts and block diagrams in the drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the drawings. For example, two blocks shown in succession may, in fact, can be executed substantially concurrently, or the blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules involved in the embodiments of the present disclosure may be implemented in software or hardware. The name of the module does not constitute a limitation on the module itself. For example, an obtaining module may also be described as "a module for obtaining a plurality of pieces of alarm data to be processed".

The functions described above herein may be performed, at least in a portion, by one or more hardware logic components. For example, without limitation, exemplary types of hardware logic components that can be used include: a field Programmable Gate Array (FPGA), an Application Specific Integrated Circuit (ASIC), an Application Specific Standard Product (ASSP), a System on Chip (SOC), a Complex Programmable Logical device (CPLD) and the like.

In the context of the present disclosure, a machine-readable medium may be a tangible medium that may contain or store a program for use by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium would include an electrical connection with one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

According to one or more embodiments of the present disclosure, Example 1 provides an alarm data processing method, including:

obtaining a plurality of pieces of alarm data to be processed;

for each piece of alarm data of at least a portion of the plurality of pieces of alarm data, extracting threat indicators from the piece of alarm data; and for each threat indicator of at least a portion of the threat indicators that are extracted, performing data correlation analysis on the threat indicator to correlate pieces of historical data related to the threat indicator.

According to one or more embodiments of the present disclosure, Example 2 provides the method of Example 1, where the performing data correlation analysis on the threat indicator to correlate the pieces of historical data related to the threat indicator includes:
- performing structuring processing on the threat indicator to obtain a structured threat indicator, where the structured threat indicator includes at least one of following field information: a network address field, a port field, a domain name field, and a command field;
- obtaining, according to the field information of the structured threat indicator, the pieces of historical data related to the threat indicator; and
- for each piece of historical data of at least a portion of the pieces of historical data related to the threat indicator, correlating the piece of historical data related to the threat indicator with the structured threat indicator to constitute a piece of suspected risk information.

According to one or more embodiments of the present disclosure, Example 3 provides the method of Example 2, where the structured threat indicator includes the network address field, the port field, the domain name field, and the command field;
- the obtaining, according to the field information of the structured threat indicator, the pieces of historical data related to the threat indicator includes one or more of following:
- in response to both the network address field and the port field being non-blank values, obtaining, according to a field value of the network address field and a field value of the port field, pieces of chat data related to the threat indicator;
- in response to the domain name field being a non-blank value, obtaining, from pieces of historical domain name system data, pieces of domain name system data matching a field value of the domain name field;
- in response to the command field being a non-blank value, obtaining, according to a field value of the command field, pieces of host data related to the threat indicator; and
- obtaining, according to the field value of the network address field and the field value of the domain name field, pieces of threat intelligence data related to the threat indicator, where the pieces of historical data related to the threat indicator includes the matching chat data, the matching domain name system data, the related host data, and the related threat intelligence data.

According to one or more embodiments of the present disclosure, Example 4 provides the method of Example 3, where the obtaining, according to the field value of the network address field and the field value of the port field, the pieces of chat data related to the threat indicator includes:
- obtaining, from pieces of historical chat data, pieces of chat data that match both the field value of the network address field and the field value of the port field, as the pieces of chat data related to the threat indicator.

According to one or more embodiments of the present disclosure, Example 5 provides the method of Example 4, where the obtaining, according to the field value of the network address field and the field value of the port field, the pieces of chat data related to the threat indicator further includes:
- determining, according to a corresponding relationship between a network address and a domain name, a target domain name corresponding to the field value of the network address field; and
- obtaining, from the pieces of historical chat data, pieces of chat data matching the target domain name, as the pieces of chat data related to the threat indicator.

According to one or more embodiments of the present disclosure, Example 6 provides the method of Example 3, where the obtaining, according to the field value of the network address field and the field value of the domain name field, the pieces of threat intelligence data related to the threat indicator includes:
- in response to the network address field being a non-blank value, obtaining, from pieces of historical threat intelligence data, first threat intelligence data matching the field value of the network address field;
- in response to the domain name field being a non-blank value, obtaining, from the pieces of historical threat intelligence data, second threat intelligence data matching the field value of the domain name field; and
- performing aggregation processing on the first threat intelligence data, the second threat intelligence data, and historical alarm data of the threat indicator to obtain the pieces of threat intelligence data related to the threat indicator.

According to one or more embodiments of the present disclosure, Example 7 provides the method of Example 3, where the obtaining, according to the field information of the structured threat indicator, the pieces of historical data related to the threat indicator further includes:
- obtaining, from pieces of historical chat data, pieces of chat data that match both a network address and a port in the matching domain name system data, as the related chat data.

According to one or more embodiments of the present disclosure, Example 8 provides the method of any one of Examples 2-7, where the method further includes:
- filtering out pieces of suspected risk information of which alarm times reach a preset number of times per unit time from all pieces of suspected risk information; and
- for each piece of suspected risk information of at least a portion of the pieces of suspected risk information obtained after filtering, determining whether the piece of suspected risk information is real risk information according to the piece of historical data related to the threat indicator in the piece of suspected risk information.

According to one or more embodiments of the present disclosure, Example 9 provides the method of Example 8, where the determining whether the piece of suspected risk information is the real risk information according to the piece of historical data related to the threat indicator in the piece of suspected risk information includes:
- determining whether the piece of suspected risk information is the real risk information by a pre-trained alarm pre-judging model according to the piece of historical data related to the threat indicator in the piece of suspected risk information.

According to one or more embodiments of the present disclosure, Example 10 provides the method of any one of Examples 1-7, before the step of extracting threat indicators from the piece of alarm data for each piece of alarm data of at least a portion of the plurality of pieces of alarm data, the method further includes:
- filtering out pieces of false alarm data and/or pieces of alarm data of an irrelevant business scenario from the plurality of pieces of alarm data; and
- the step of extracting threat indicators from the piece of alarm data for each of the at least a portion of the plurality of pieces of alarm data includes:

for each piece of alarm data of at least a portion of the plurality of pieces of alarm data obtained after filtering, extracting threat indicators from the piece of alarm data.

According to one or more embodiments of the present disclosure, Example 11 provides the method of any one of Examples 1-7, before the step of performing data correlation analysis on the threat indicator for each threat indicator of at least a portion of the threat indicators that are extracted, the method further includes:

filtering out threat indicators included in a threat indicator white list from the threat indicators that are extracted; and the step of performing data correlation analysis on the threat indicator for each of the at least a portion of the threat indicators that are extracted includes:

for each threat indicator of at least a portion of the threat indicators obtained after filtering, performing data correlation analysis on the threat indicator.

According to one or more embodiments of the present disclosure, Example 12 provides the method of any one of Examples 1-7, where the extracting threat indicators from the piece of alarm data includes:

extracting the threat indicators from the piece of alarm data by a machine learning-based classification model and a plurality of regular expression-based extraction models respectively, where the plurality of regular expression-based extraction models include an attack type-based regular expression expert model and at least one universal regular expression-based universal model; and generating a threat indicator extraction result of the piece of alarm data according to a first extraction result of the classification model and a second extraction result of each of the extraction models.

According to one or more embodiments of the present disclosure, Example 13 provides an alarm data processing apparatus, including:

an obtaining module, configured to obtain a plurality of pieces of alarm data to be processed;

an extraction module, configured to extract, for each piece of alarm data of at least a portion of the plurality of pieces of alarm data, threat indicators from the piece of alarm data; and a correlation analysis module, configured to perform, for each threat indicator of at least a portion of the threat indicators that are extracted, data correlation analysis on the threat indicator to correlate pieces of historical data related to the threat indicator.

According to one or more embodiments of the present disclosure, Example 14 provides a computer-readable medium, storing a computer program thereon, where when the program is executed by a processing apparatus, the steps of the method of any one of Examples 1-12 are implemented.

According to one or more embodiments of the present disclosure, Example 15 provides an electronic device, including:

a storage apparatus, storing a computer program thereon;

a processing apparatus, configured to execute the computer program in the storage apparatus to implement the steps of the method of any one of Examples 1-12.

The above description is only preferred embodiments of the present disclosure and an illustration of the applied technical principles. Those skilled in the art should understand that the disclosure scope involved in the present disclosure is not limited to the technical solutions formed by the specific combination of the above technical features, and should also cover other technical solutions formed by the arbitrary combination of the above technical features or their equivalent features without departing from the above disclosed concept. For example, a technical solution formed by replacing the above features with the technical features with similar functions disclosed in the present disclosure (but not limited to).

In addition, although various operations are described in a specific order, this should not be understood as requiring these operations to be performed in the specific order shown or in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments may also be implemented in combination in a single embodiment. Conversely, various features that are described in the context of a single embodiment may also be implemented in multiple embodiments individually or in any suitable sub-combination.

Although the subject matter has been described in language specific to structural features and/or logical actions of the method, it should be understood that the subject matter defined in the appended claims is not necessarily limited to the specific features or actions described above. On the contrary, the specific features and actions described above are only exemplary forms for implementing the claims. Regarding the apparatus in the above embodiments, the specific manner in which each module performs an operation has been described in detail in the embodiments related to the method, and will not be described in detail here.

The invention claimed is:

1. An alarm data processing method, comprising:
obtaining a plurality of pieces of alarm data to be processed;
filtering out pieces of false alarm data and/or pieces of alarm data of a business scenario that is not concerned from the plurality of pieces of alarm data;
for each piece of alarm data of at least a portion of the plurality of pieces of alarm data obtained after filtering, extracting threat indicators from the piece of alarm data, wherein the extracting threat indicators from the piece of alarm data comprises:
extracting the threat indicators from the piece of alarm data by a machine learning-based classification model and a plurality of regular expression-based extraction models respectively, wherein the plurality of regular expression-based extraction models comprise an attack type-based regular expression expert model and at least one universal regular expression-based universal model; and
generating a threat indicator extraction result of the piece of alarm data according to a first extraction result of the classification model and a second extraction result of each of the extraction models; and
for each threat indicator of at least a portion of the threat indicators that are extracted, performing data correlation analysis on the threat indicator to correlate pieces of historical data related to the threat indicator.

2. The method according to claim 1, wherein,
the performing data correlation analysis on the threat indicator to correlate the pieces of historical data related to the threat indicator comprises:

performing structuring processing on the threat indicator to obtain a structured threat indicator, wherein the structured threat indicator comprises at least one of following field information: a network address field, a port field, a domain name field, and a command field;

obtaining, according to the field information of the structured threat indicator, the pieces of historical data related to the threat indicator; and for each piece of historical data of at least a portion of the pieces of historical data related to the threat indicator, correlating the piece of historical data related to the threat indicator with the structured threat indicator to constitute a piece of suspected risk information.

3. The method according to claim 2, wherein the structured threat indicator comprises the network address field, the port field, the domain name field, and the command field;

the obtaining, according to the field information of the structured threat indicator, the pieces of historical data related to the threat indicator comprises one or more of following steps:

in response to both the network address field and the port field being non-blank values, obtaining, according to a field value of the network address field and a field value of the port field, pieces of chat data related to the threat indicator;

in response to the domain name field being a non-blank value, obtaining, from pieces of historical domain name system data, pieces of domain name system data matching a field value of the domain name field;

in response to the command field being a non-blank value, obtaining, according to a field value of the command field, pieces of host data related to the threat indicator; or obtaining, according to the field value of the network address field and the field value of the domain name field, pieces of threat intelligence data related to the threat indicator, wherein the pieces of historical data related to the threat indicator comprises the pieces of chat data related to the threat indicator, the pieces of domain name system data matching the field value of the domain name field, the pieces of host data related to the threat indicator, and the pieces of threat intelligence data related to the threat indicator.

4. The method according to claim 3, wherein the obtaining, according to the field value of the network address field and the field value of the port field, the pieces of chat data related to the threat indicator comprises:

obtaining, from pieces of historical chat data, pieces of chat data that match both the field value of the network address field and the field value of the port field, as the pieces of chat data related to the threat indicator.

5. The method according to claim 4, wherein the obtaining, according to the field value of the network address field and the field value of the port field, the pieces of chat data related to the threat indicator further comprises:

determining, according to a corresponding relationship between a network address and a domain name, a target domain name corresponding to the field value of the network address field; and obtaining, from the pieces of historical chat data, pieces of chat data matching the target domain name, as the pieces of chat data related to the threat indicator.

6. The method according to claim 3, wherein the obtaining, according to the field value of the network address field and the field value of the domain name field, the pieces of threat intelligence data related to the threat indicator comprises:

in response to the network address field being a non-blank value, obtaining, from pieces of historical threat intelligence data, first threat intelligence data matching the field value of the network address field;

in response to the domain name field being a non-blank value, obtaining, from the pieces of historical threat intelligence data, second threat intelligence data matching the field value of the domain name field; and performing aggregation processing on the first threat intelligence data, the second threat intelligence data, and historical alarm data of the threat indicator to obtain the pieces of threat intelligence data related to the threat indicator.

7. The method according to claim 3, wherein the obtaining, according to the field information of the structured threat indicator, the pieces of historical data related to the threat indicator further comprises:

obtaining, from pieces of historical chat data, pieces of chat data that match both a network address and a port in the domain name system data, as the pieces of chat data related to the threat indicator.

8. The method according to claim 2, further comprising:

filtering out pieces of suspected risk information of which alarm times reach a preset number of times per unit time from all pieces of suspected risk information; and for each piece of suspected risk information of at least a portion of the pieces of suspected risk information obtained after filtering, determining whether the piece of suspected risk information is real risk information according to the piece of historical data related to the threat indicator in the piece of suspected risk information.

9. The method according to claim 8, wherein the determining whether the piece of suspected risk information is the real risk information according to the piece of historical data related to the threat indicator in the piece of suspected risk information comprises:

determining whether the piece of suspected risk information is the real risk information by a pre-trained alarm pre-judging model according to the piece of historical data related to the threat indicator in the piece of suspected risk information.

10. The method according to claim 1, wherein, before performing data correlation analysis on the threat indicator, the method further comprises:

filtering out threat indicators comprised in a threat indicator white list from the threat indicators that are extracted; and wherein the performing data correlation analysis on the threat indicator for each of the at least a portion of the threat indicators that are extracted comprises:

for each threat indicator of at least a portion of the threat indicators obtained after filtering, performing data correlation analysis on the threat indicator.

11. A non-transitory computer-readable medium, storing a computer program thereon, wherein when the program is executed by a processing apparatus, an alarm data processing method is implemented, wherein the method comprises:

obtaining a plurality of pieces of alarm data to be processed;

filtering out pieces of false alarm data and/or pieces of alarm data of a business scenario that is not concerned from the plurality of pieces of alarm data;

for each piece of alarm data of at least a portion of the plurality of pieces of alarm data obtained after filtering, extracting threat indicators from the piece of alarm data, wherein the extracting threat indicators from the piece of alarm data comprises:
extracting the threat indicators from the piece of alarm data by a machine learning-based classification model and a plurality of regular expression-based extraction models respectively, wherein the plurality of regular expression-based extraction models comprise an attack type-based regular expression expert model and at least one universal regular expression-based universal model; and
generating a threat indicator extraction result of the piece of alarm data according to a first extraction result of the classification model and a second extraction result of each of the extraction models; and
for each threat indicator of at least a portion of the threat indicators that are extracted, performing data correlation analysis on the threat indicator to correlate pieces of historical data related to the threat indicator.

12. An electronic device, comprising:
a hardware apparatus, storing a computer program thereon;
a processing apparatus, configured to execute the computer program in the storage apparatus to implement an alarm data processing method, wherein the method comprises:
obtaining a plurality of pieces of alarm data to be processed;
filtering out pieces of false alarm data and/or pieces of alarm data of a business scenario that is not concerned from the plurality of pieces of alarm data;
for each piece of alarm data of at least a portion of the plurality of pieces of alarm data obtained after filtering, extracting threat indicators from the piece of alarm data, wherein the extracting threat indicators from the piece of alarm data comprises:
extracting the threat indicators from the piece of alarm data by a machine learning-based classification model and a plurality of regular expression-based extraction models respectively, wherein the plurality of regular expression-based extraction models comprise an attack type-based regular expression expert model and at least one universal regular expression-based universal model; and
generating a threat indicator extraction result of the piece of alarm data according to a first extraction result of the classification model and a second extraction result of each of the extraction models; and
for each threat indicator of at least a portion of the threat indicators that are extracted, performing data correlation analysis on the threat indicator to correlate pieces of historical data related to the threat indicator.

13. The electronic device according to claim 12, wherein, the performing data correlation analysis on the threat indicator to correlate the pieces of historical data related to the threat indicator comprises:
performing structuring processing on the threat indicator to obtain a structured threat indicator, wherein the structured threat indicator comprises at least one of following field information: a network address field, a port field, a domain name field, and a command field;
obtaining, according to the field information of the structured threat indicator, the pieces of historical data related to the threat indicator; and
for each piece of historical data of at least a portion of the pieces of historical data related to the threat indicator,
correlating the piece of historical data related to the threat indicator with the structured threat indicator to constitute a piece of suspected risk information.

14. The electronic device according to claim 13, wherein the structured threat indicator comprises the network address field, the port field, the domain name field, and the command field;
the obtaining, according to the field information of the structured threat indicator, the pieces of historical data related to the threat indicator comprises one or more of following steps:
in response to both the network address field and the port field being non-blank values, obtaining, according to a field value of the network address field and a field value of the port field, pieces of chat data related to the threat indicator;
in response to the domain name field being a non-blank value, obtaining, from pieces of historical domain name system data, pieces of domain name system data matching a field value of the domain name field;
in response to the command field being a non-blank value, obtaining, according to a field value of the command field, pieces of host data related to the threat indicator;
obtaining, according to the field value of the network address field and the field value of the domain name field, pieces of threat intelligence data related to the threat indicator, wherein the pieces of historical data related to the threat indicator comprises the pieces of chat data related to the threat indicator, the pieces of domain name system data matching the field value of the domain name field, the pieces of host data related to the threat indicator, and the pieces of threat intelligence data related to the threat indicator.

15. The electronic device according to claim 14, wherein the obtaining, according to the field value of the network address field and the field value of the port field, the pieces of chat data related to the threat indicator comprises:
obtaining, from pieces of historical chat data, pieces of chat data that match both the field value of the network address field and the field value of the port field, as the pieces of chat data related to the threat indicator.

16. The electronic device according to claim 15, wherein the obtaining, according to the field value of the network address field and the field value of the port field, the pieces of chat data related to the threat indicator further comprises:
determining, according to a corresponding relationship between a network address and a domain name, a target domain name corresponding to the field value of the network address field; and
obtaining, from the pieces of historical chat data, pieces of chat data matching the target domain name, as the pieces of chat data related to the threat indicator.

17. The electronic device according to claim 14, wherein the obtaining, according to the field value of the network address field and the field value of the domain name field, the pieces of threat intelligence data related to the threat indicator comprises:
in response to the network address field being a non-blank value, obtaining, from pieces of historical threat intelligence data, first threat intelligence data matching the field value of the network address field;
in response to the domain name field being a non-blank value, obtaining, from the pieces of historical threat intelligence data, second threat intelligence data matching the field value of the domain name field; and
performing aggregation processing on the first threat intelligence data, the second threat intelligence data, and historical alarm data of the threat indicator to obtain the pieces of threat intelligence data related to the threat indicator.

18. The electronic device according to claim 14, wherein the obtaining, according to the field information of the structured threat indicator, the pieces of historical data related to the threat indicator further comprises:
    obtaining, from pieces of historical chat data, pieces of chat data that match both a network address and a port in the domain name system data, as the pieces of chat data related to the threat indicator.

\* \* \* \* \*